United States Patent [19]

Shirai

[11] Patent Number: 5,273,381

[45] Date of Patent: Dec. 28, 1993

[54] BALL SCREW GUIDE UNIT AND TRANSPORTING TABLE USING THE SAME

[75] Inventor: Takeki Shirai, Ichikawa, Japan

[73] Assignee: THK Co., Ltd., Tokyo, Japan

[21] Appl. No.: 779,739

[22] Filed: Oct. 23, 1991

[30] Foreign Application Priority Data

Oct. 25, 1990 [JP] Japan .................. 2-287832

[51] Int. Cl.$^5$ .................................... B23Q 5/40
[52] U.S. Cl. .................................... 409/219; 82/141; 269/60; 384/10
[58] Field of Search ............... 409/219, 145, 146, 235, 409/238; 384/9, 10, 45; 82/141; 408/234; 269/60, 203

[56] References Cited

U.S. PATENT DOCUMENTS

| | | | |
|---|---|---|---|
| 4,753,540 | 6/1988 | Mottate | 384/10 X |
| 4,897,588 | 1/1990 | Takei | 318/661 |
| 4,916,963 | 4/1990 | Takei | 74/42.8 B |

FOREIGN PATENT DOCUMENTS

| | | | |
|---|---|---|---|
| 0029224 | 8/1972 | Japan | 82/141 |
| 62-200016 | 9/1987 | Japan . | |
| 2055639 | 3/1981 | United Kingdom . | |

Primary Examiner—Z. R. Bilinsky
Attorney, Agent, or Firm—Armstrong, Westerman, Hattori, McLeland & Naughton

[57] ABSTRACT

In the ball screw guide unit of the invention, since a guide rail is formed of a channel bar having a groove, and a ball screw shaft is engaged with a movable member which is reciprocatively movable in the groove along a lengthwise direction of the guide rail, so that the centroid of the guide rail is adjacent to the axis of the ball screw shaft. Therefore, when a pretension is applied to the ball screw shaft, a straightness of the guide rail is not impaired and a feed accuracy of the movable member can be maintained. Further, the guide rial may be provided at its lower and side surfaces with reference surfaces used for adjusting parallelism between the guide rail and the axis of the ball screw shaft, in which case assembly and adjustment of the table can be performed more easily.

3 Claims, 15 Drawing Sheets

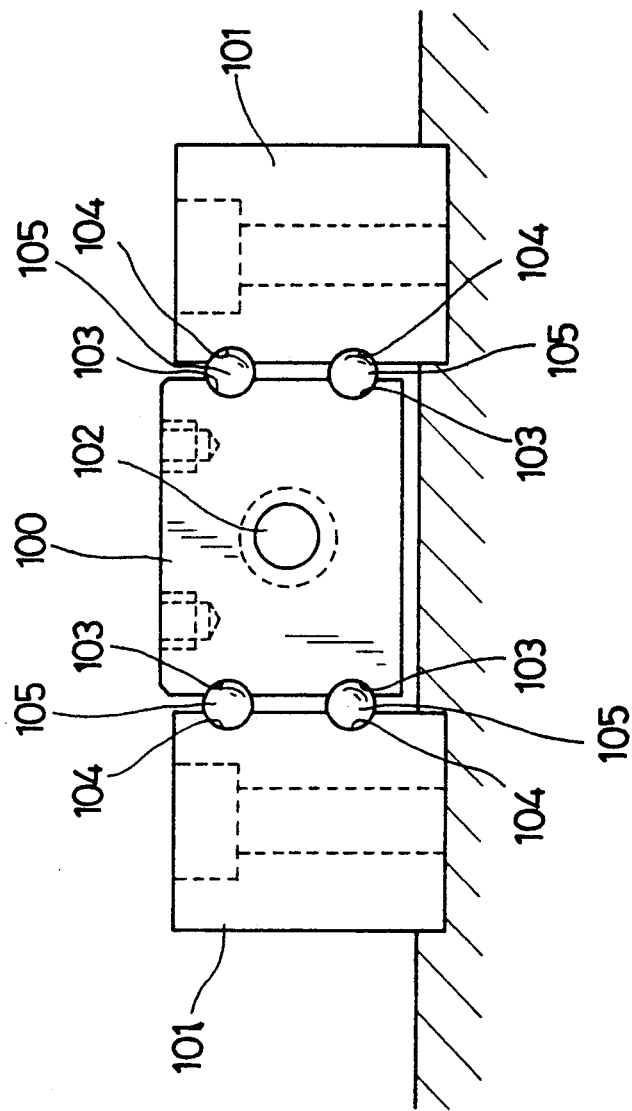

BALL SCREW GUIDE UNIT AND TRANSPORTING TABLE USING THE SAME

FIELD OF THE INVENTION AND RELATED ART STATEMENT

The present invention relates to a ball screw guide unit used in a linear motion part of, e.g., a machine tool and a robot, and also relates to a transporting table using the same.

A transporting device using such a ball screw has structures, for example, as shown in FIG. 24 (see Japanese Laid-Open Patent publication No. 62-200016 and others). In the Figure, a movable member 100 is supported by a pair of guide rails 101 and is movable in a lengthwise direction thereof. A ball screw shaft 102 is screwed into the movable member 100 for reciprocating the movable member 100 by rotating the shaft 102. The movable member 100 is supported at its opposite sides by the guide rails 101 through balls 103. Direct screwing of the ball screw shaft 102 into the movable member 100 enables a compact construction of the device. In a conventional construction in which a ball screw is used for driving a table in a general manner, a pretension may be applied to the ball screw shaft for absorbing an accuracy error caused by a thermal expansion. In the device shown in FIG. 24, the pretension applied to the ball guide screw 102 causes a bending moment applied to the guide rails 101, which may cause warp of the guide rails 101, and thus a bed and/or a saddle to which the guide rails 101 are attached may bend, resutling in reduction of a feed accuracy of the movable member.

Since the movable member 100 to which the ball screw shaft 102 is screwed is carried by the guide rails 101, the movable member 100 serves to prevent whirling of the ball screw shaft 102. However, if the pretension is applied, the ball screw shaft 102 is also bent by a reaction force applied by the bent guide rails 101, and thus the ball screw shaft 102 cannot maintain a predetermined straightness, resulting in whirling.

In order to prevent such disadvantages caused by the pretension, sizes of the guide rails 101 may be increased to obtain a high rigidity in the prior art. However, this increases structural sizes and the weight of the device as well as cost.

Further, in the device described above, a table which is supported by linear bearings to allow reciprocation is assembled to the movable member 100, and the reciprocating motion of the movable member 100 caused by the rotating motion of the ball screw shaft 102 is transferred to the table. In this device, there is such a disadvantage that it requires a time consuming work for adjusting parallelism between guide surfaces of the linear bearings, to which the table is fixed, and the ball screw shaft 102. Specifically, the adjustment of the parallelism between the guide surfaces of the linear bearings and ball screw shaft 102 should be performed, using an indicator put on the outer peripheral surface of the ball screw shaft 102, which makes the adjustment difficult. Especially, in the prior art shown in FIG. 24, in addition to the adjustment of the parallelism between the guide rails 101 and the ball screw shaft 102, it is required to adjust the parallelism between the ball screw shaft 102 and guide surfaces at a table side, which makes the work extremely difficult.

OBJECT AND SUMMARY OF THE INVENTION

Accordingly, it is an object of the invention to provide a ball screw guide unit, overcoming the above-noted problems,, in which a pretension can be applied without reducing the straightness of the ball screw shaft.

It is another object of the invention to provide a ball screw guide unit and a transporting table using the same, in which a table carried by a linear bearing is assembled to the ball screw guide unit to form the transporting table, and parallelism between a guide surface of a linear bearing and a ball screw shaft can be easily adjusted.

In order to achieve the above-noted objects, a ball screw guide unit according to the invention comprises a guide rail formed of a channel bar having a groove; a movable member which is fitted between side surfaces of the groove with balls therebetween and is movable along a lengthwise direction of the guide rail; a ball screw shaft which is rotatably carried by the guide rail and is screwed into the movable member for reciprocating the movable member along the guide rail; and a pretension mechanism for applying an axial tension load to a portion of the ball screw shaft between bearing portions provided at opposite ends of the guide rail.

In the ball screw guide unit of the above construction, since the guide rail is formed of a channel bar having the groove, the centroid of the rail is located near the groove, and the ball screw shaft engaging the movable member is also located near the groove, so that the centroid of the guide rail is adjacent to the axis of the ball screw shaft. Therefore, when the pretension mechanism applies a tension load to the ball screw shaft, a reaction force acts as a compression load at a position near the centroid of the guide rail, so that a bending moment acting on the guide rail is small. Therefore, the straightness of the guide rail is maintained, and the feed accuracy of the movable member can be increased.

Especially, if the axis of the ball screw shaft is substantially coincident with the centroid of the guide rail, the pretension applied to the ball screw shaft does not cause the bending moment in the guide rail, and thus the straightness of the guide rail can be perfectly maintained.

Since the channel bar itself forming the guide rail has a high rigidity against bending owing to its configuration, it is not necessary to increase a thickness of the guide rail for increasing the rigidity, as has been done in the prior art, so that the sizes and weight of the guide rail can be reduced.

Even if the ball screw shaft whirls, an influence by the whirling of the ball screw shaft is not applied to the table assembled to the movable member, because the movable member is carried by the guide rail having the high rigidity. Therefore, accurate motion of the table can be ensured.

A transporting table may have a construction, in which the movable member of the ball screw guide unit is assembled to a table which is supported by a linear bearing and can reciprocate on a bed, the guide rail is fixed to the bed, and the table can be fed forwardly and backwardly by an amount corresponding to an amount of rotation of the ball screw shaft. In this construction, the guide rail may be preferably provided at its lower and side surfaces with reference surfaces used for adjusting parallelism between the guide rail and the axis of the ball screw shaft.

According to the construction described above, the parallelism between the guide rail and axis of the ball screw shaft can be adjusted in advance, using the reference surface formed on the side surface of the guide rail. Therefore, the parallelism between the axis of the ball screw shaft and the guide surface of the linear bearing can be maintained only by adjusting the parallelism between the reference surface formed on the guide rail and the guide surface of the linear baring, and thus assembly and adjustment of the table can be easy.

BRIEF DESCRIPTION OF THE DRAWINGS

FIG. 11 is a front sectional view;

FIG. 12 is a side sectional view;

FIG. 13 is a bottom view;

FIG. 14 is a front view;

FIG. 15 is a rear view;

FIG. 16 is an enlarged cross section taken along line XI—XI in FIG. 15;

FIG. 17 is a top view of a return piece;

FIG. 18 is a side view of a return piece;

FIG. 24 is a cross section of a ball screw unit in the prior art.

DETAILED DESCRIPTION OF THE PREFERRED EMBODIMENTS

Figure 1:
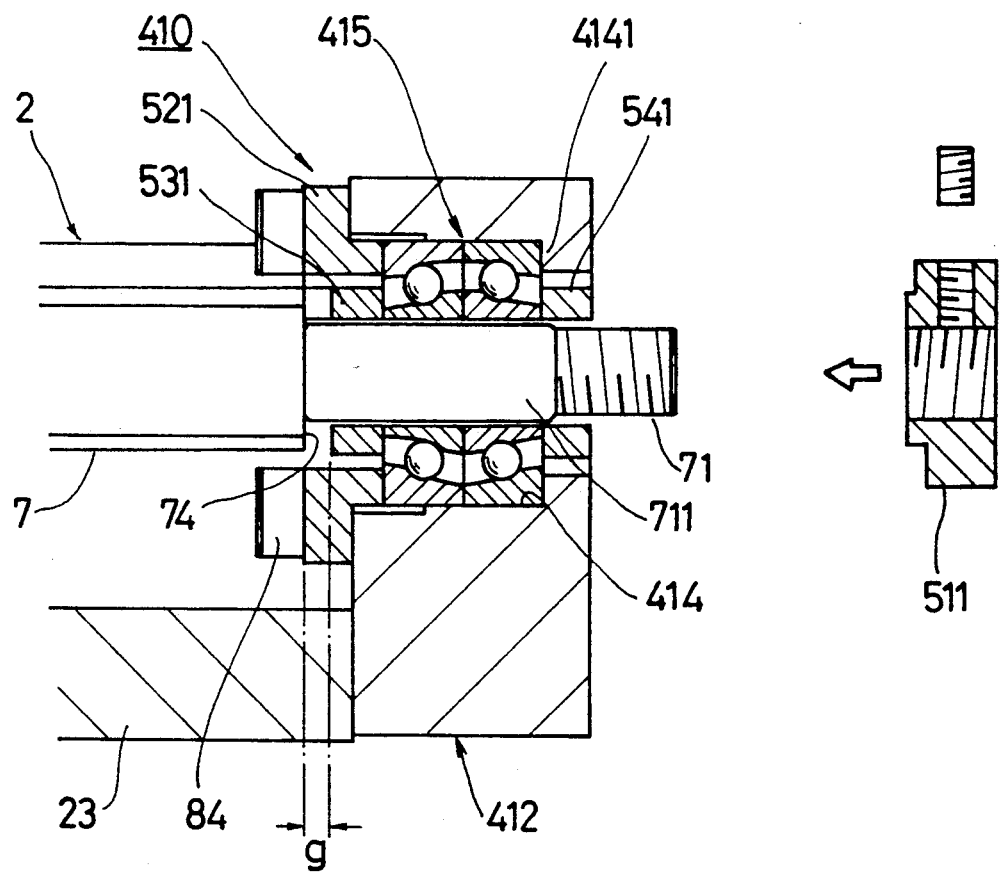
FIG. 1 is a longitudinally sectional view of a major part of a first bearing portion of a ball screw shaft in a free state before applying a tension load thereto by a pretension mechanism.
Figure 2:
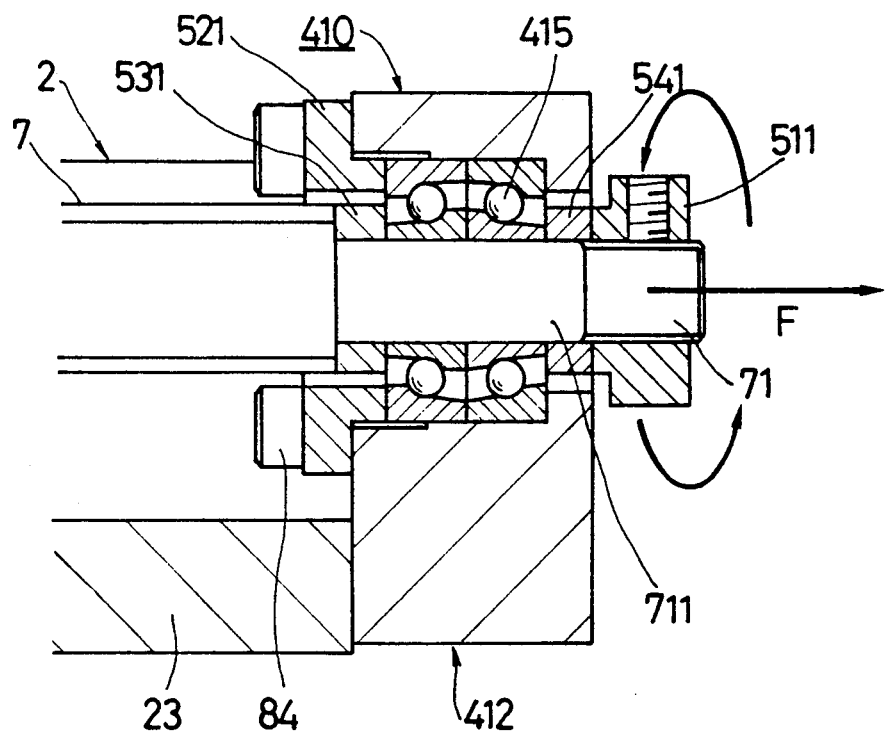
FIG. 2 is a longitudinally sectional view of a major part of an end of a shaft shown in FIG. 1 to which a tension load is applied.

The invention will be described below with reference to embodiments shown in the drawings. In FIGS. 1-22 showing a ball screw guide unit according to an embodiment of the invention, a numeral 1 generally indicates a ball screw guide unit, which is substantially formed of a guide rail 2, a movable member 3 which is movably supported by the guide rail 2, a ball screw shaft 7 screwed into the movable member 3, a pair of bearing portions 410 and 420 for supporting the ball screw shaft 7, a motor 18 for driving the ball screw shaft 7, and a pretension mechanism 50 for applying a tensional preload to the ball screw shaft 7.

The guide rail 2 is formed of a channel bar of a U-shaped section having a concave groove 21 and includes a bottom wall 23 forming a bottom of a groove 21 and side walls 22 which extend perpendicularly from the opposite sides of the bottom wall 23.

The movable member 3 is held and supported between the inner side surfaces 22a of the groove 21 in the guide rail 2, i.e., between the two side walls 22. The movable member 3 is inserted through its nearly full height into the groove 21, and has an top surface which is projected slightly beyond top surfaces of the side walls 22.

The side surfaces of the groove 21 in the guide rail 2 are faced to right and left surfaces of the movable member 3, respectively. Each of these right and left side surfaces is provided with two ball rolling surfaces 4a and 4b, or 5a and 5b on which rolling members, i.e., balls 6 are guided to roll.

The ball rolling surfaces 4a, 4b, 4c and 4d (see FIG. 8) provided guide rail 2 are four in total number, and are located at corners of wide grooves 22b formed in the inner side surfaces 22a of the side walls 22.

Figure 9:
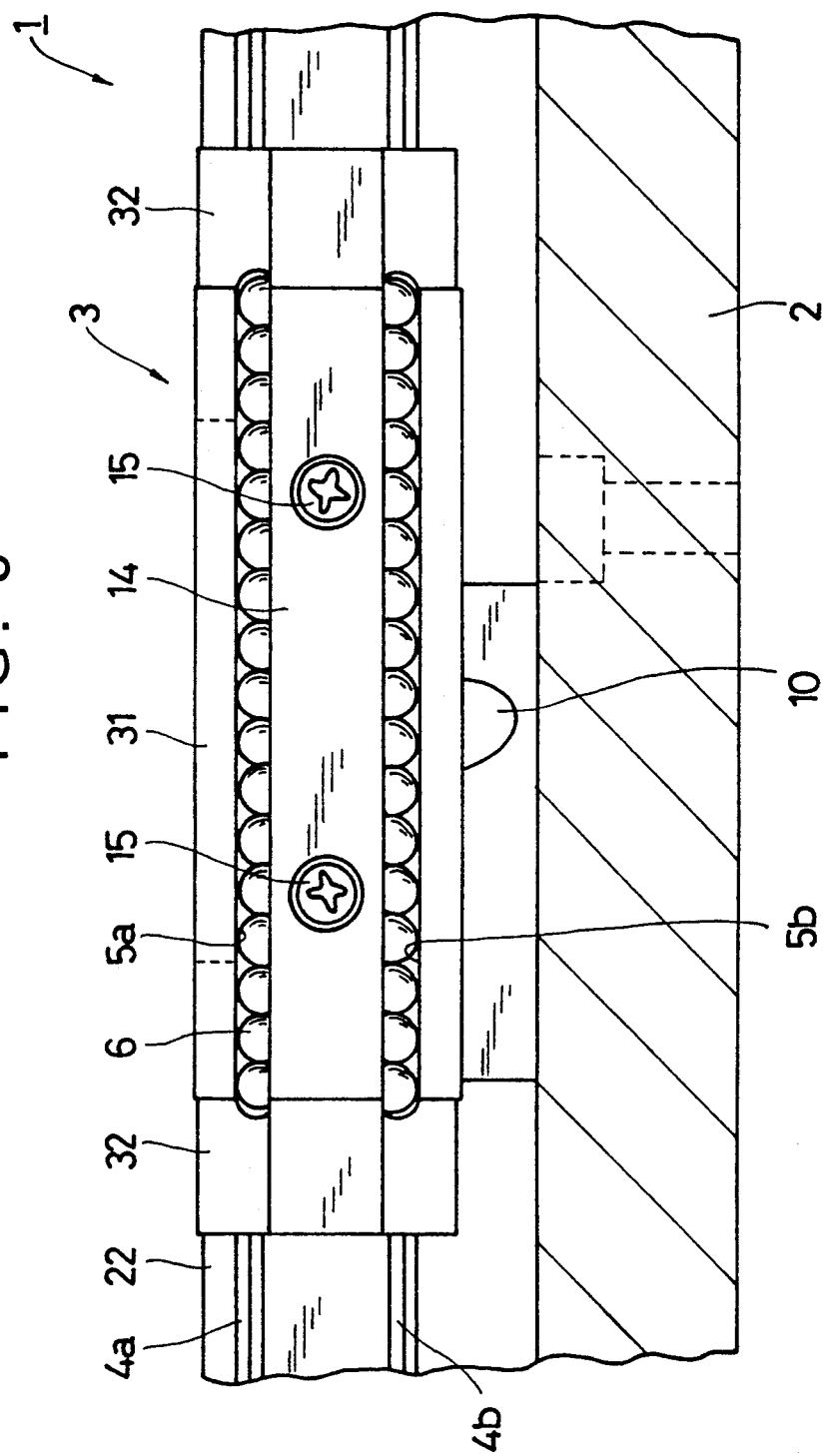
FIG. 9 is a side sectional view of a device in FIG. 1.
Figure 10:
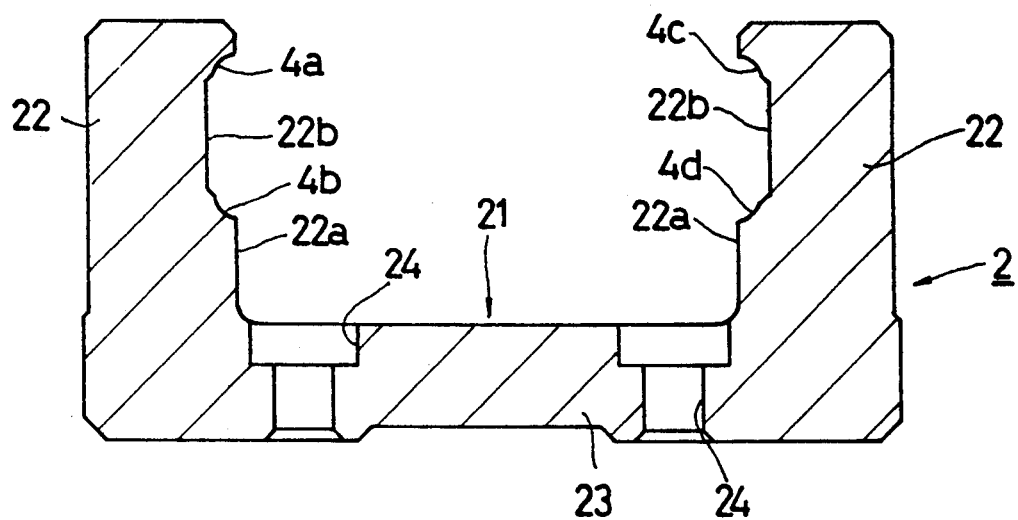
FIG. 10 is a cross section of a guide rail of a device in FIG. 3.
Figure 11:
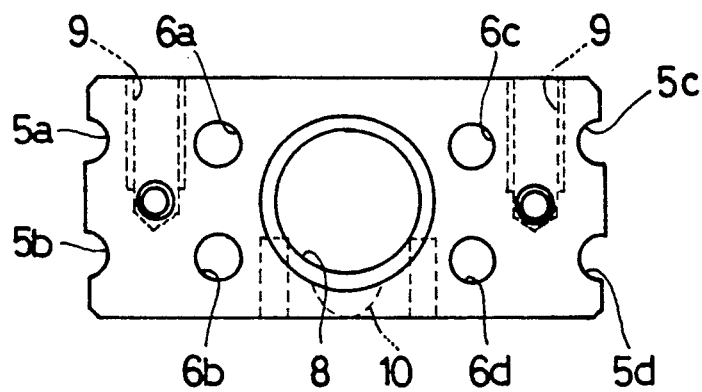
FIGS. 11-13 show a table body of a device in FIG. 3.
Figure 12:
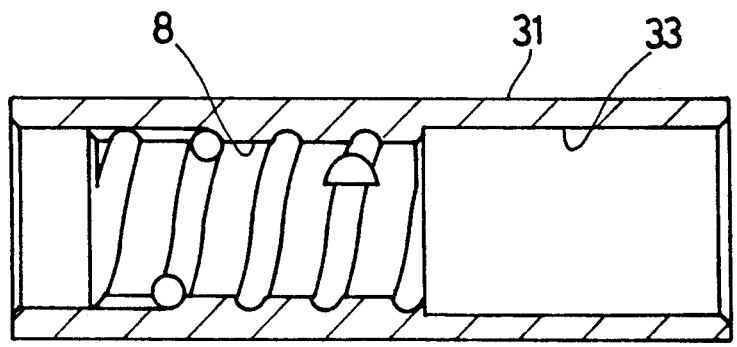
Figure 13:
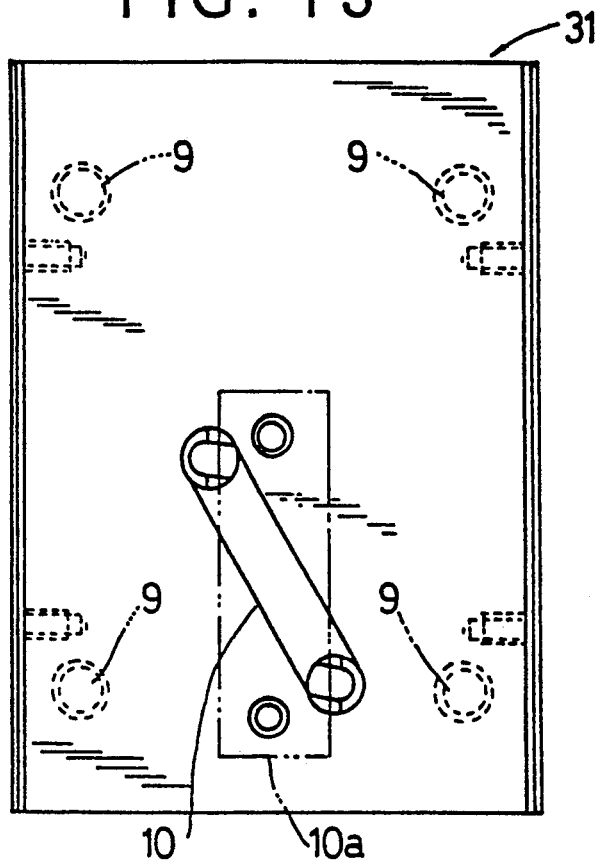
Figure 14:
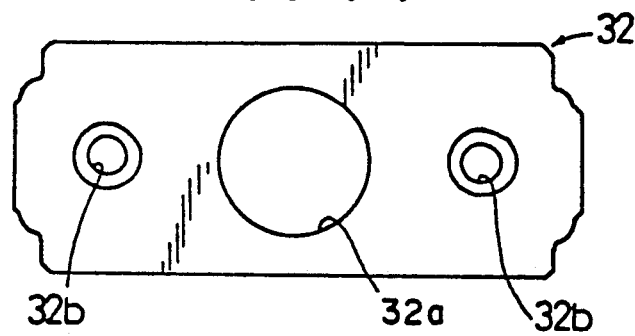
FIGS. 14-18 show an end plate.
Figure 15:
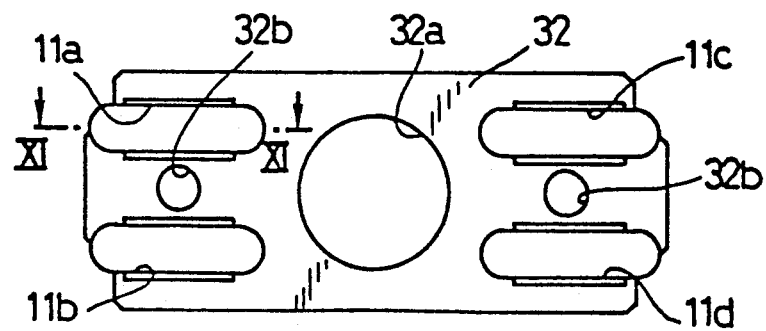
Figure 16:
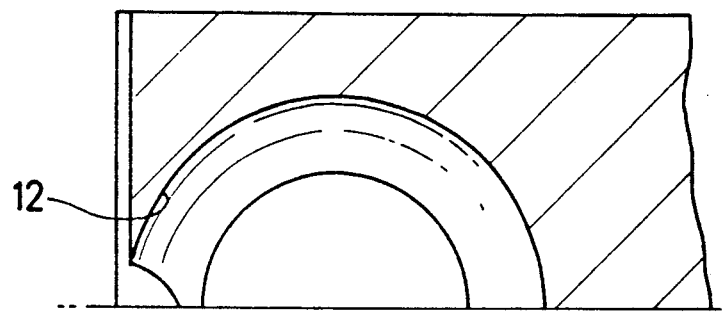
Figure 17:
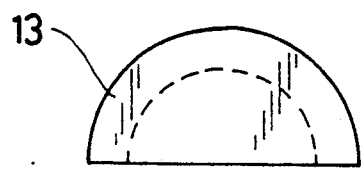
Figure 18:
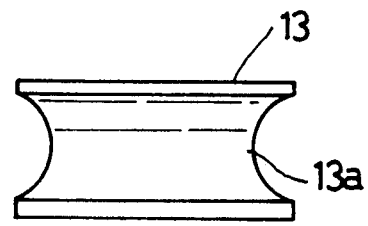
Figure 20:
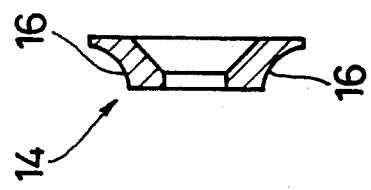
FIG. 20 is a cross section taken along line XV—XV in FIG. 19.
Figure 19:
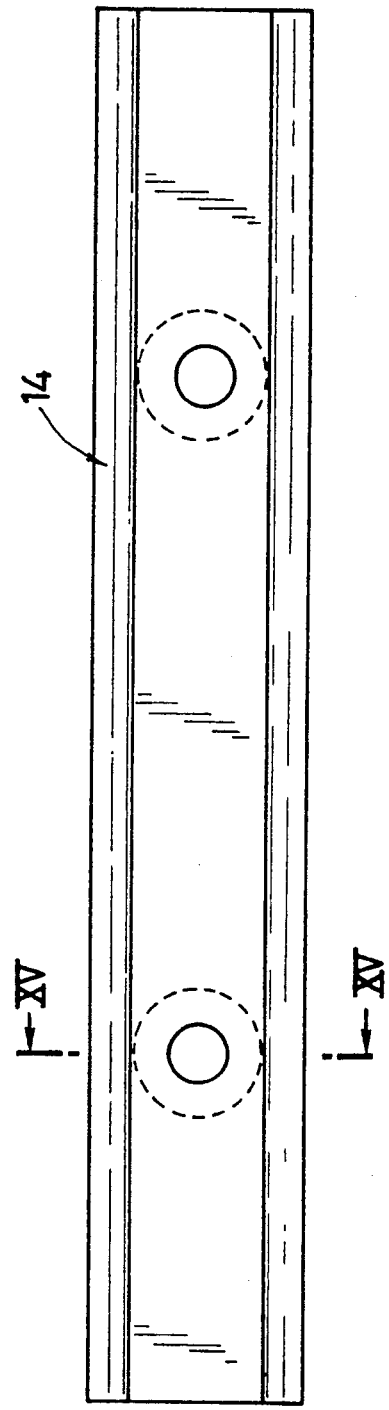
FIG. 19 is a front view of a holder.

The movable member 3 is formed of a movable member body 31 and end plates 32 fixed to opposite end surfaces of the body 31 (see FIG. 9). The movable member body 31 is provided at its opposite side surfaces with, altogether, four recessed ball rolling surfaces 5a, 5b, 5c and 5d which correspond to the ball rolling surfaces 4a, 4b, 4c and 4d of the guide rail 2, respectively. A large number of the balls 6 are rotatably interposed between the opposed ball rolling surfaces 4a and 5a, 4b and 4b, 4c and 5c, and 4d and 5d.

Opposite ends 71 and 72 of the ball screw shaft 7 are rotatably carried by first and second bearing portions 410 and 420 arranged at the opposite ends of the guide rail 2.

The first bearing portion 410 includes a first end plate 412 fixed to one end surface of the guide rail 2 by bolts 411, and a first ball bearing 415 having a double row angular contact configuration and fitted in an axial aperture 414 which is formed at a central portion of the first end plate 412. A first axial end 71 of the ball screw shaft 7 is fitted into the axial aperture 414 of the first end plate 412 through the first ball bearing 415.

The second bearing portion 420 is formed of a housing 423 having a second end plate 422 which is fixed to the other end surface of the guide rail 2 by bolts 421, and a second ball bearing 425 having a double row angular contact configuration and fitted into an axial aperture 424 formed at a central portion of the second end plate 422. A second end 72 of the ball screw shaft 7 is inserted into an axial aperture 424 of the second end plate 422 through a second bearing 425.

The second axial end 72 is provided with a connecting shaft portion 723, a threaded portion 722 and a journal portion 721 which are axially aligned in this order from the end of the end portion 72. The journal portion 721 is fitted into the second ball bearing 425, and the connecting shaft portion 723 and the threaded portion 722 are extended through the axial aperture 424 toward a motor 18. The connecting shaft 723 is connected to a drive shaft 181 of the motor 18 through the coupling 19.

The motor 18 is fixed to a third end plate 426 formed on the housing 423 by bolts 182. The drive shaft 181 is coaxial with the ball screw shaft 7. The third end plate 426 is faced to the second end plate 422 with a predetermined axial space therebetween. The space between the second and third end plates 422 and 426 is used to accommodate the coupling 19. The coupling 19 is provided with apertures 191 and 192. The drive shaft 181 of the motor 18 and the connecting shaft portion 723 of the ball screw shaft 7 are inserted into the apertures 191 and 192, respetively, and are fixed to the coupling by screws 193 and 194. An upper opening of the housing 423 of the motor 18 is covered with upper and lower support covers 427 and 428. A connector 429 for forming an electrical connection to the motor 18 is attached to the lower support cover 428.

Positions of the first end plate 412 of the first bearing portion 410 and the second end plate 422 of the second bearing portion 420 can be adjusted in a direction perpendicular to the ball screw shaft 7. The side surface of the guide rail 2 forms a reference surface A for adjusting parallelism between an axis of the ball screw shaft 7 and the guide rail. The position adjustment of the first end plate 412 can be performed, utilizing a slight play between the bolts 411 and bolt apertures 411a. Similarly, the position adjustment of the second end plate 422 can be performed, utilizing a slight play between the bolts 421 and the bolt apertures 421a.

A pretension mechanism 50 is formed of first and second bearing holder nuts 511 and 512 which engage with the ball bearings 415 and 425 in the first and second bearing portions 71 and 72, respectively. In the illustrated embodiment, the bearing holder nut 512 of the second bearing portion 420 is initially fastened for assembling the motor 18 and others, and finally, the first bearing holder nut 511 of the first bearing portion 410 independent from the motor and others is fastened, so that a tension load is applied to the ball shaft 7.

The second ball bearing 425 is inserted into the axial aperture 424 from an end opening thereof faced to the guide rail 2. A portion of the axial aperture 424 near the motor 18 has a diameter smaller than an outer diameter of the second ball bearing 425, so that the axial aperture 425 is provided with a stepped portion, against which the second bearing 425 is abutted by a bearing holder 522 screwed into the axial aperture 424.

First and second collars 532 and 542 are fitted around the journal portion 721 of the second bearing portion 72 with the second ball bearing 425 therebetween. The first collar 531 is interposed between an end surface of the second ball bearing 425 near the guide rail 2 and a stepped portion 73 formed at a base end of the journal portion 721 of the ball screw shaft 7. The second collar 54 is interposed between the other end surface of the second ball bearing 425 and the bearing holder nut 512.

The first ball bearing 415 is inserted into the axial aperture 414 from an end opening thereof faced to the guide rail 2. A portion of the axial aperture 414 remote from the motor 18 has a diameter smaller than an outer diameter of the first ball bearing 415, so that the axial aperture 425 is provided with a stepped portion 4141, against which the first bearing 415 is abutted by the bearing holder 521 screwed into the axial aperture 414.

First and second collars 531 and 541 are fitted around the journal portion 711 of the first bearing portion 71 with the first ball bearing 415 therebetween. The first collar 531 is interposed between an end surface of the first ball bearing 415 near the guide rail 2 and a stepped portion 74 formed at a base end of the journal portion of the ball screw shaft 7. The second collar 541 is interposed between the first ball bearing 415 and the first bearing holder nut 511.

The ball screw shaft 7 is initially in a free state during an assembling operation, as shown in FIG. 1. The first ball bearing 415 and the stepped surface 74 of the ball screw shaft 7 are located to form a gap g corresponding to an amount of preliminary tension, and thereafter, the bearing holder nut 511 is fastened to expand the ball screw shaft 7 by an amount corresponding to the gap g for applying a tension load F. Therefore, only by fastening the bearing holder nut 511, the tension load of an appropriate amount can be set.

In the illustrated embodiment, since a centroid of the nearly U-shaped section of the guide rail 2 is coincident with an axis 0 of the ball screw shaft 7, a compression load formed by a reaction force of the pretension of the ball screw shaft 7 does not act as a deviated load against the guide rail 2.

With respect to the construction of the movable member 3, the movable member body 31 is provided at its center with a penetrated ball screw aperture 8 engaging with a feed screw shaft, i.e., ball screw shaft 7. The ball screw aperture 8 is located on a line substantially connecting centers of spans between the upper and lower ball rolling surfaces 5a and 5b. In this embodiment, the ball screw aperture has a diameter similar to the spans between the ball rolling surfaces 5a, 5b, 5c and 5d.

Between the ball screw aperture 8 and side surfaces of the movable member body 31, there are provided four ball escape apertures 6a, 6b, 6c and 6d for escaping the balls 6 from the load regions. The ball apertures 6a, 6b, 6c and 6d correspond to the ball rolling surfaces 5a, 5b, 5c and 5d, and two of them are spaced from the other two apertures with the ball screw aperture 8 therebetween. The ball screw apertures 6a, 6b, 6c and 6d are located on horizontal lines passing through the ball rolling surfaces 5a, 5b, 5c and 5d, respectively. A preload is applied to each ball 6. This preload is obtained by fitting the balls 6 in a compressed state into each of gaps formed by four sets of mutually faced ball rolling surfaces 4a and 5a, 4b and 5b, 4c and 5c, and 4d and 5d.

Between the ball escape apertures 6a, 6b, 6c and 6d and the side surfaces of the movable member body 31, there are provided bolt holes 9 for attaching an object to be transported to the movable member body 31.

The ball screw aperture 8 passing through the center of the movable member body 31 has a threaded groove at a region nearly corresponding to a half of a region at which an aperture 33 penetrating the movable member body 31 is formed. A return tube 10 is associated with aperture 8 to form a ball return passage. The return tube 10 is held by a holder 10a. The preload is also applied to the balls 6 located between the ball screw shaft 7 and the ball screw aperture 8 so as to prevent rattling which may be caused in the axial direction of the ball screw shaft 7. In order to apply the preload, a difference may be formed between the pitch of the threaded groove in the ball screw aperture 8 and the pitch of the thread of the ball screw shaft 7, or other structures also may be employed.

Figure 8:
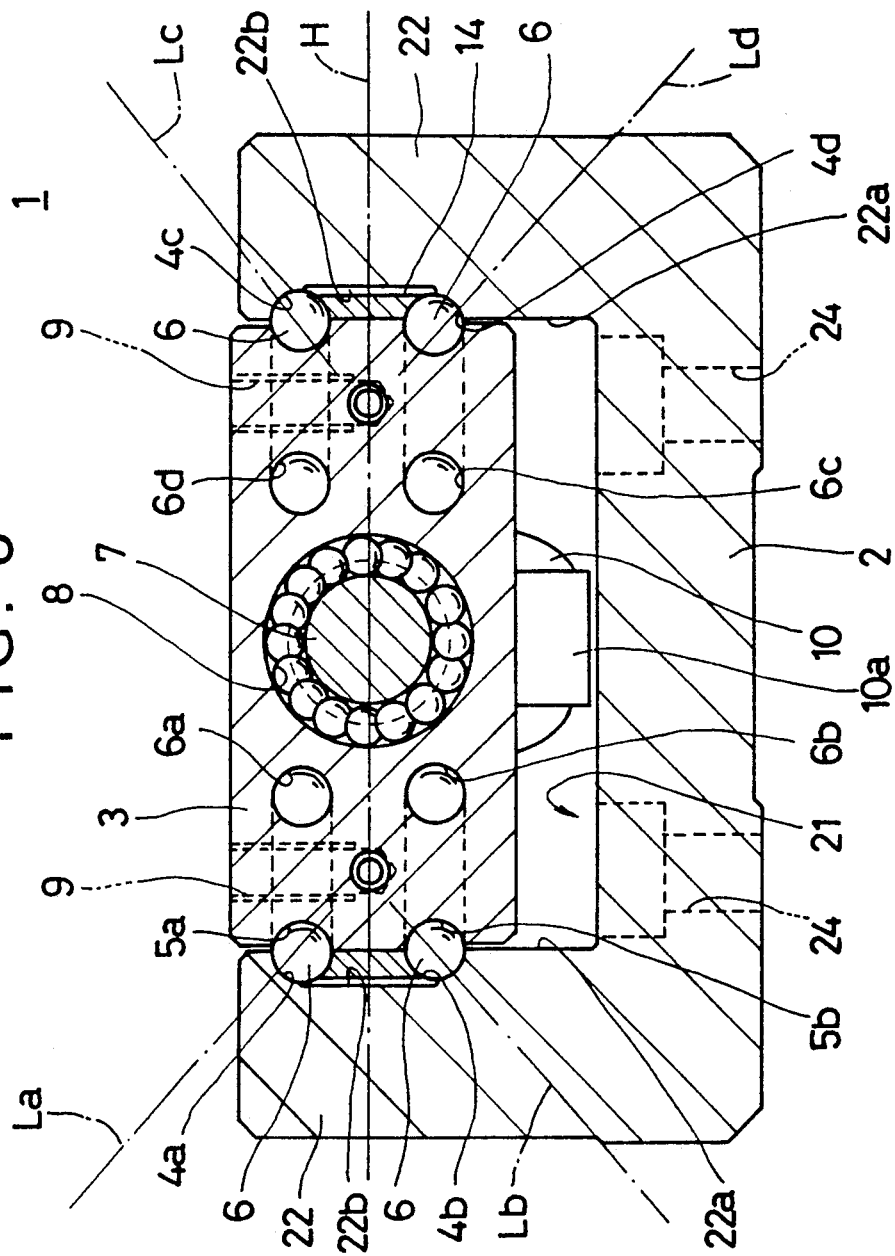
FIG. 8 is a longitudinally sectional view of a portion of a table in FIG. 3.

The balls 6 interposed between the side surfaces of the movable member body 31 and the inner side surfaces of the guide rail 2 contact the corresponding ball rolling surfaces 4a and 5a, 4b and 5b, 4c and 5c, or 4d and 5d in contact directions which are determined to form outwardly diverging fashion and specifically is so determined that imaginary lines La, Lb, Lc and Ld passing through contact points between the respective balls 6 and the corresponding ball rolling surfaces 4a and 5a, 4b and 5b, 4c and 5c, and 4d and 5d and through the balls may converge toward the center of the ball screw shaft 7 with respect to a horizontal line H passing through the center of the ball screw shaft 7 (see FIG. 8). Angles between the imaginary lines La, Lb, Lc and Ld and the horizontal line H may be desirably approximately 45 degrees.

The end plate 32 is a rectangular member having a shape similar to that of the end surface of the movable member body 31, and is provided at its center with a through aperture 32a for inserting the ball screw shaft 7. Bolt apertures 32b are disposed at laterally opposite sides of the insertion aperture 32a for fixing the end plate 32 to the movable member body 31 (see FIGS. 14 and 15).

An attaching surface of the end plate 32 for the movable member body 31 is provided with four return passages 11a, 11b, 11c and 11d for returning the balls 6 located in the load region between the movable member body 31 and the guide rail 2 to the ball escape apertures 6a, 6b, 6c and 6d (see FIGS. 14–18). The return passage 11a is formed of a recessed groove 12 of a semicircular section in the end plate 32, and a return piece 13 which has a semicircular shape and is assembled concentrically with respect to the groove 12. The return piece 13 is provided at its outer periphery with an arc shaped groove 13a complementary in shape to the outer periphery of the ball 6, so that the arc-shaped groove 13a and the recessed groove 12a in the end plate 32 form the tubular return passages 11a, 11b, 11c and 11d of a semicircular configuration. It is desirable that a curvature of each of the return passages 11a, 11b, 11c and 11d is nearly three times the diameter or the ball or more.

Ball retainers 14 for retaining the balls 6 are disposed between the side surfaces of the movable member body 31 and the inner side surfaces of the guide rail 2. Each ball retainer 14 is a plate member accommodated in a groove 22b which is formed at an inner side surface of each side wall 22 of the guide rail 2. The retainer 14 is pressed at its one surface to the side surface of the movable member body 31 and is fixed by screws 15.

Each retainer 14 is provided at its opposite side edges with grooves 16 (see FIGS. 19 and 20) of arc-shaped sections curved correspondingly to the curvature of the ball 6, so that the balls 6 in the upper and lower rows are held by the arc-shaped grooves 16 without disengaging from the movable member body 31.

The retainers 14 are disposed in spaces between the upper and lower ball rolling surfaces having spans increased to an maximum extent, and are disposed in spaced them. Thus, the retainers 14 have widths nearly equal to full widths of the spans, and the arc-shaped grooves 16 at the opposite side edges are adjacent to the balls 6. The the balls 6 in the load regions roll without contacting these arc-shaped grooves 16.

The ball screw shaft 7 screwed into the ball screw aperture 8 in the movable member 3 is rotatably supported at its one end by the bearing portion 17 provided at one end of the guide rail 2, and is drivingly connected at the other end through the coupling 19 to the motor 18 attached to the other end of the guide rail 2.

Figure 3:
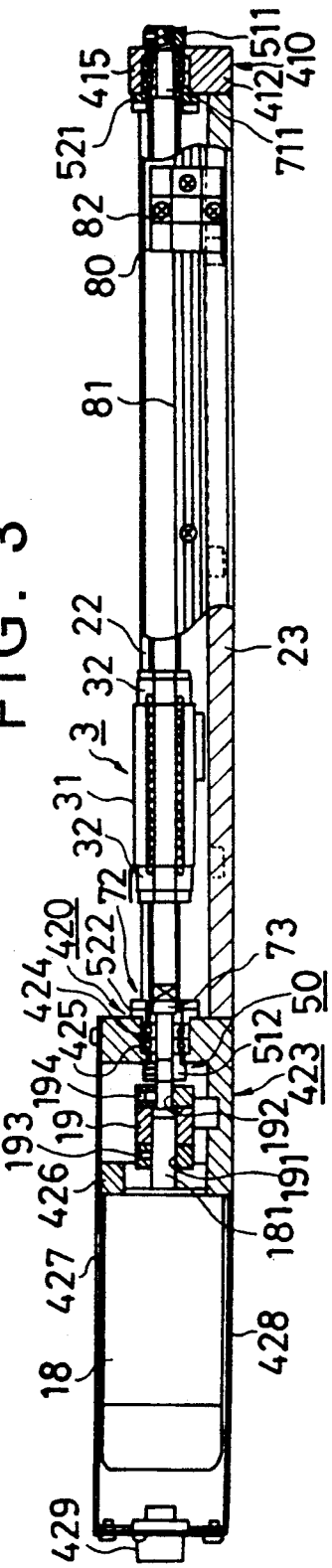
FIG. 3 is an elevation showing a whole configuration of a transporting device with a certain part cut away.
Figure 4:
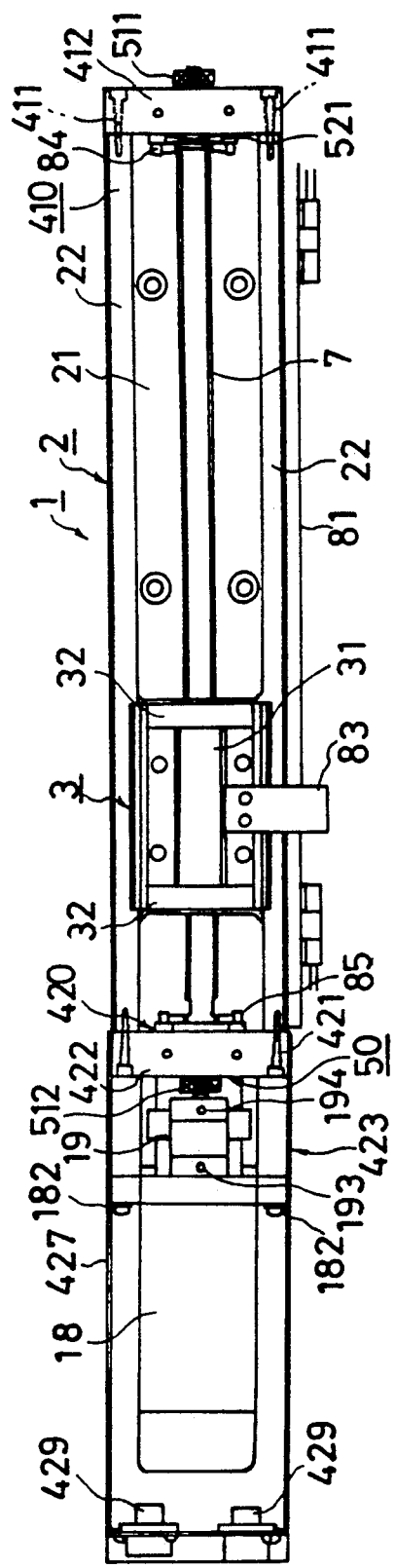
FIG. 4 is a top view of a device in FIG. 3.
Figure 5:
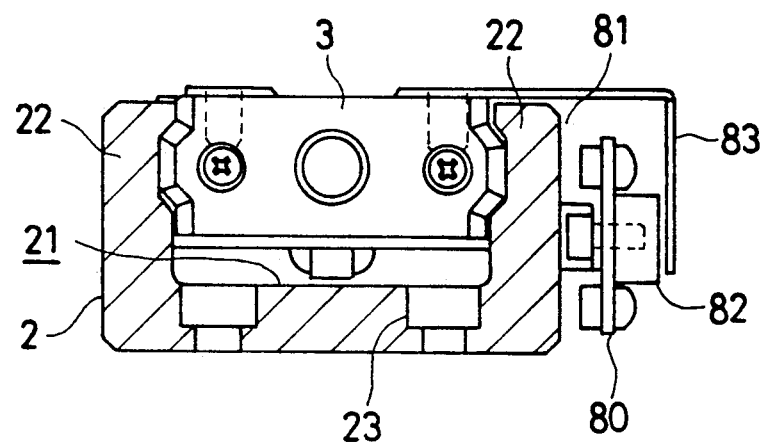
FIG. 5 is a side view of a device in FIG. 3 with a certain part cut away.
Figure 6:
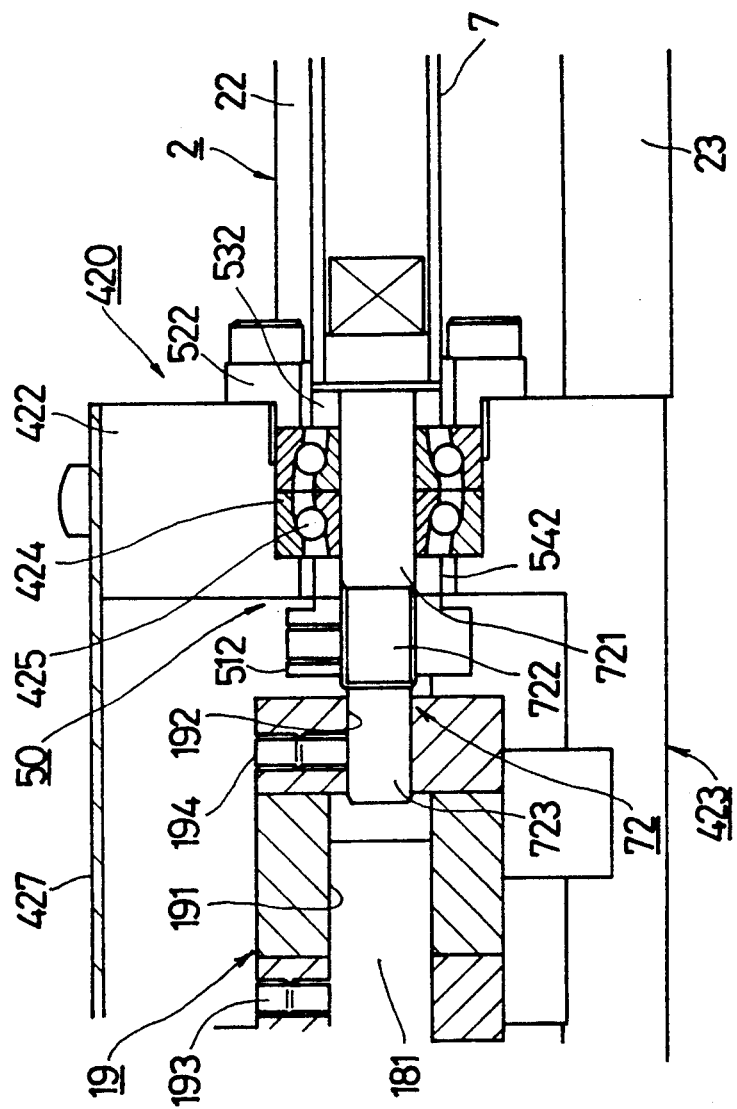
FIG. 6 is a front sectional view of a major part.
Figure 7:
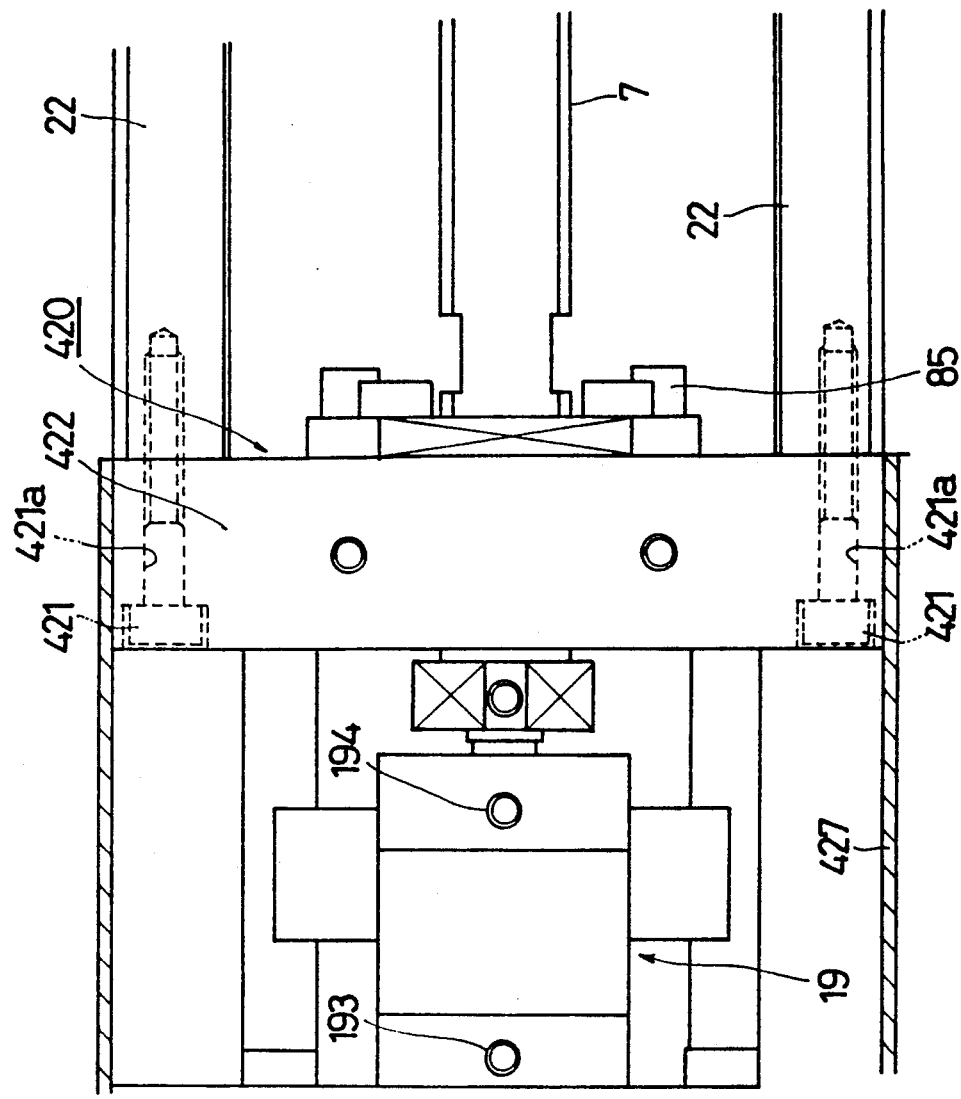
FIG. 7 is a top view of a part in FIG. 6.

In FIGS. 3–5, a numeral 80 indicates an attachment plate for attaching a sensor (not shown). The plate 80 can be fixed at an arbitrary position on a rail 81 disposed on and along the outer side surface of the guide rail 2. The sensor is attached to the sensor attachment plate 80 through a attachment piece 82. When a covering plate 83 attached to the movable member 3 crosses the sensor, it is detected the movable member 3 is in a predetermined position (e.g., an initial position).

A numeral 84 indicates an annular first stop fitted into the axial aperture 413 in the first bearing portion 71, and a numeral 85 indicates a second stop provided in the second bearing portion 72. These stops contact the end surfaces of the movable member 3 for restricting a range of motion of the movable member 3.

In the ball screw guide unit thus constructed, when the motor 18 is driven to rotate, the ball screw shaft 7 is rotated, and the rotation thereof is transferred through the ball screw aperture 8 to the movable member 3, so that the movable member 3 linearly reciprocates along the guide rail 2.

In this operation, the tension load F has been applied to the ball screw shaft 7 by the first and second bearing holder nuts 511 and 512 for absorbing the thermal expansion of the ball screw shaft 7 which may be caused by a high-speed rotation. As a reaction thereof, a compression load is applied to the guide rail 2 through the first and second end plates 412 and 422 of the first and second bearing portions 410 and 420. The guide rail 2, however, is formed of the U-shaped channel bar having the high rigidity against bending, so that the side walls 22 serve as reinforcing beams and can prevent deformation such as buckling. Since the centroid of the guide rail 2 and the axis O of the ball screw shaft 7 coincide with each other, the compression load applied to the guide rail 2 does not shift with respect to the axis of the ball screw shaft, so that an unnecessary bending moment is not applied to the guide rail 2.

As described above, since the bending moment is not applied to the guide rail 2, the ball screw shaft 7 is held in a straight state. This fact as well as the fact that opposite sides of the movable member 3 are supported by the balls 6 serve to prevent whirling of the ball screw shaft 7, which allows accurate control of transportation.

In this embodiment, the contact directions of the balls 6 interposed between the table 3 and the guide rail 2 are inclined to diverge outwardly with respect to the horizontal line H passing through the center of the ball screw shaft 7, so that vertical and horizontal loads applied to the movable member 3 are effectively born by the balls 6. Specially, if the inclination angle is at 45 degrees, the rows in the four direction, i.e., vertical and horizontal directions can be equally born. Further, the preload applied to the balls 6 can effectively prevent the rattling of the movable member 3.

As described above, since the rattling of the movable member 3 can be prevented, it is impossible to prevent vibrations, which may be caused during the transporting operations, and particularly starting and stopping operations, i.e., pitching (vibration of the movable member 3 caused around an axis perpendicular to a sheet of FIG. 3), rolling (vibration of the movable member 3 caused around an axis perpendicular to a sheet of FIG. 5) and yawing (vibration of the movable member 3 caused around an axis perpendicular to a sheet of FIG. 4), so that the movable member 3 can be transported smoothly. Since the span between the upper and lower ball rolling surfaces are increased as large as possible, the construction has a large strength with respect to a moment load which acts to rotate the movable member 3 around the transporting axis.

Figure 21:
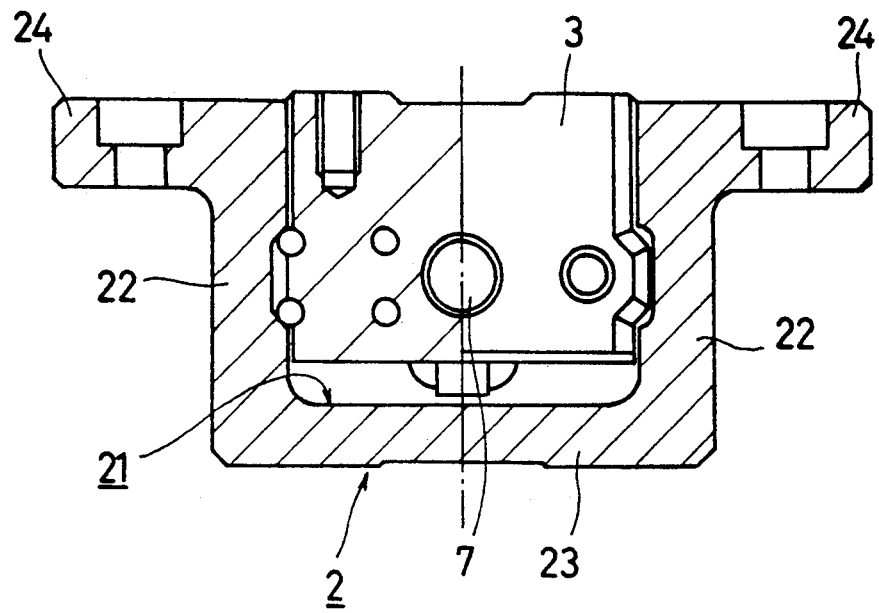
FIGS. 21 and 22 are fragmentary cross sections for illustrating a configuration of a guide rail of another embodiment according to the invention.
Figure 22:
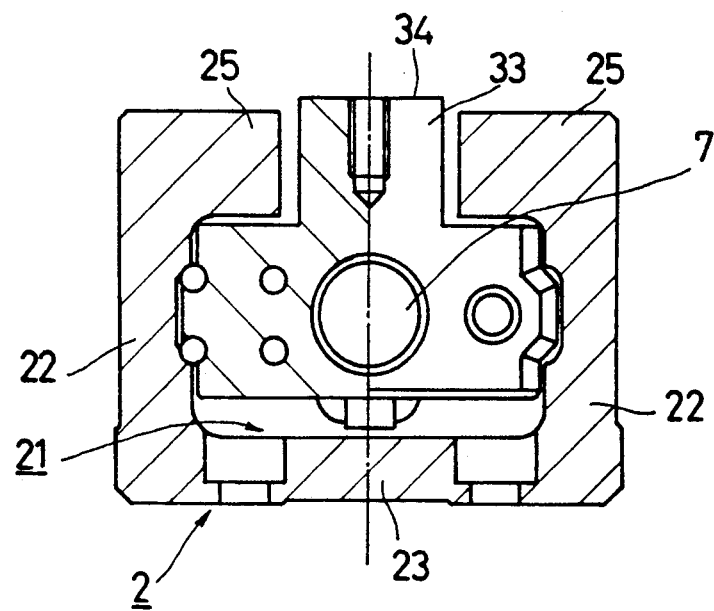

It should be noted that the section of the guide rail 2 is not restricted to a simple U-shaped configuration in the illustrated embodiment, and, as shown in FIG. 21, may be a flanged U-shaped configuration in which the side walls 22 are provided at their ends with horizontally projected flanges 24. Further, as shown in FIG. 22, it may be a U-shaped configuration provided with lips 25, which are formed at the upper ends of the side walls 22 and extend inwardly to narrow the opening of the groove 21.

By employing the U-shaped configuration having the flanges or the lips, the rigidity of the guide rail 2 can be further increased so that the pretension can be applied more effectively to the ball screw shaft 7. Among them, in the U-shaped configuration having the lips, the movable member 3 is accommodated in the guide rail 2, and the movable member 3 is provided at its top surface with a stepped projection 33 projected between the lips 25. This stepped projection 33 forms an attaching surface 34.

Figure 23:
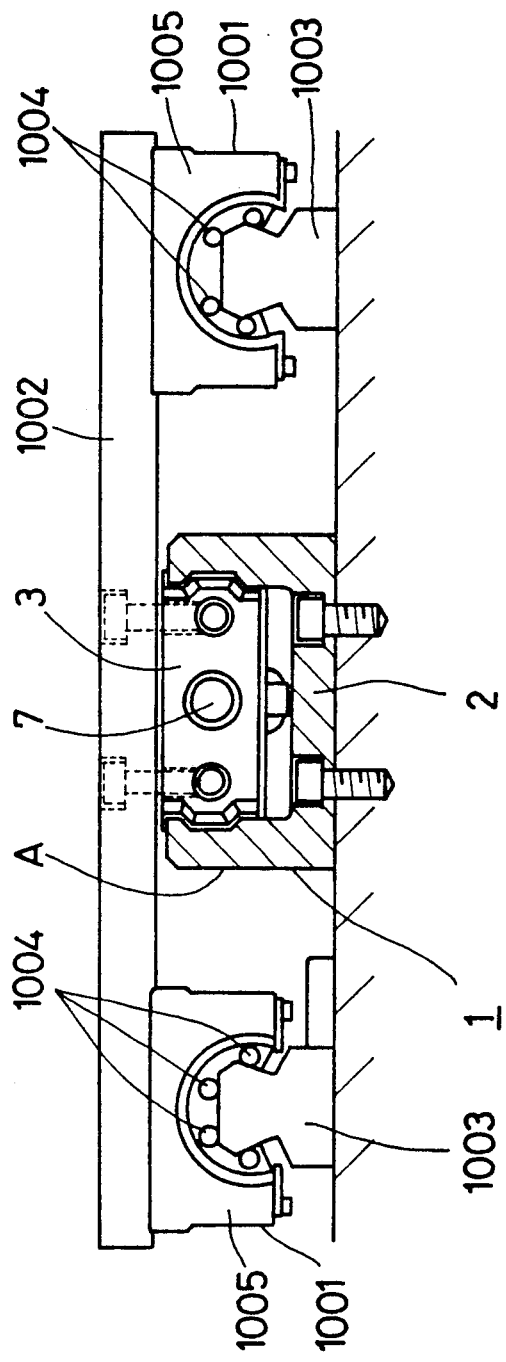
FIG. 23 is a schematic cross section showing a transporting table provided with a ball screw guide unit according to the invention.

FIG. 23 shows a transporting table provided with the ball screw guide unit 1 in the embodiment described above. A stationary bed 1000 supports a table 1002 through a pair of right and left linear bearings 1001 to allow reciprocation thereof. The linear bearings 1001 may be formed of various well-known guide mechanisms. Each linear bearing is formed of a rail bed 1003, and a bearing body 1005 which is slidably guided along the lengthwise direction of the rail bed 1003 through rolling members 1004.

The ball screw guide unit 1 is disposed between the two linear bearings 1001, and the guide rail 2 of the ball screw guide unit 1 is fixed to the stationary bed 1000. The movable member 3 is fixed to the table 1002. The parallelism between the axis of the ball screw shaft 7 and a guide surface of the linear bearing 1001 is adjusted, utilizing the reference surface A formed on the lower and side surfaces of the guide rail 2.

In the ball screw guide unit 1 described above, prior to an assembling step for fixing the guide rail 2 to the bed 1000, the parallelism between the axis of the ball screw shaft 7 and the guide rail 2 can be adjusted on the basis of the reference surface A. Therefore, the adjustment of the parallelism between the axis of the ball screw shaft 7 and the guide surface of the linear bearing 1001 can be completed only by the adjustment of the parallelism between the rail bed 1003 of the linear bearing and the reference surface A formed on the guide rail 2.

In this transporting table, even if the ball screw shaft 7 is whirled, the influence by the whirling is not applied to the table 1002 assembled to the movable member 3, because the movable member 3 is supported by the guide rail 2. Accordingly, an accurate motion can be ensured.

What is claimed is:

1. A ball screw guide unit, comprising:

a guide rail having a channel shape with a groove formed between a bottom wall and opposing side walls, each side wall having a side surface facing inwardly;

a movable member engageable between said side surfaces of said guide rail with balls therebetween and wherein said member is movable along a lengthwise direction of said guide rail;

a ball screw shaft rotatably carried by said guide rail between bearing portions provided at opposite ends thereof, and wherein said ball screw shaft is threaded into said movable member for reciprocating said movable member along said guide rail, and wherein an axis of said ball screw shaft is substantially coincident with a centroid of section of said guide rail; and a pretension mechanism for applying an axial tension load to a portion of said ball screw shaft between said bearing portions.

2. A ball screw guide unit as claimed in claim 1, wherein said guide rail is provided at its lower and side peripheries with a reference surface for adjusting parallelism between said guide rail and said ball screw shaft.

3. A transporting table, comprising:

a linear bearing fixed to a bed and reciprocable therealong;

a table supported by said linear bearing so as to be reciprocable along with said linear bearing; and a drive means for imparting reciprocating motion to said table, including (a) a guide rail having a channel shape with a groove formed between a bottom wall and opposing side walls, each side wall having a side surface facing inwardly, said guide rail being fixed to said bed, (b) a movable member fixed to said table and engageable between said side surfaces of said guide rail with balls therebetween, and wherein said movable member is movable along a lengthwise direction of said rail, (c) a ball screw shaft rotatably carried by said guide rail between bearing portions provided at opposite ends thereof, wherein said ball screw shaft is threaded into said movable member for reciprocating said movable member and said table along said guide rail, and wherein an axis of said ball screw shaft is substantially coincident with a centroid of a section of said guide rail, and (d) a pretension mechanism for applying an axial tension load to a portion of said ball screw shaft between said bearing portions, said guide rail being provided at its lower and side peripheries with a reference surface for adjusting parallelism between said guide rail and said ball screw shaft.

* * * * *